(12) United States Patent  
Hirota (10) Patent No.: US 7,263,857 B2  
(45) Date of Patent: Sep. 4, 2007

(54) CONSTANT FLOW RATE EXPANSION VALUE

(75) Inventor: Hisatoshi Hirota, Hachioji (JP)

(73) Assignee: TGK Co., Ltd., Tokyo (JP)

( * ) Notice: Subject to any disclaimer, the term of this patent is extended or adjusted under 35 U.S.C. 154(b) by 61 days.

(21) Appl. No.: 11/362,871

(22) Filed: Feb. 28, 2006

(65) Prior Publication Data

US 2006/0219965 A1    Oct. 5, 2006

(30) Foreign Application Priority Data

Mar. 1, 2005    (JP) ............................. 2005-055555

(51) Int. Cl.  
*F25B 41/06* (2006.01)

(52) U.S. Cl. .......................... 62/511; 62/222

(58) Field of Classification Search ............... 62/210, 62/222, 224, 511, 527; 137/613, 491; 251/129.19  
See application file for complete search history.

(56) References Cited

U.S. PATENT DOCUMENTS 6,804,970 B2 * 10/2004 Saeki et al. ................. 62/133  
7,118,088 B2 * 10/2006 Hirota ........................ 251/129.19

FOREIGN PATENT DOCUMENTS

| EP | 1 357 339 A2 | 10/2003 |
|---|---|---|
| EP | 1 394 646 A2 | 3/2004 |
| JP | 2001-153495 | 6/2001 |
| JP | 2001-153495 A | 6/2001 |
| JP | 2004-53192 | 2/2004 |
| JP | 2004-53192 A | 2/2004 |

OTHER PUBLICATIONS

European Search Report dated Dec. 27, 2006, issued in corresponding European Application No. 06003628.2.

* cited by examiner

*Primary Examiner*—Melvin Jones  
(74) *Attorney, Agent, or Firm*—Westerman, Hattori, Daniels & Adrian, LLP.

(57) ABSTRACT

To reduce the degree of influence of differential pressure on a pilot valve of a constant flow rate expansion valve. The constant flow rate expansion valve comprises a restriction passage for restricting the flow rate of refrigerant introduced from a refrigerant inlet port, a main valve for controlling the flow rate of refrigerant having flowed out from the restriction passage for discharging the refrigerant to a refrigerant outlet port, a piston for actuating the main valve in the valve-opening/closing direction by the differential pressure between intermediate pressure on the inlet port side of the main valve and pressure in a pressure chamber formed on the opposite side of the main valve, and a pilot valve for sensing the differential pressure proportional to the flow rate of refrigerant flowing through the restriction passage, thereby controlling the pressure in the pressure chamber set by a solenoid. In parallel with the main valve are arranged the pilot valve, the pressure chamber, and a fixed orifice in series in the direction of flow of refrigerant. This makes it possible to apply only the same level of differential pressure as that of small differential pressure applied to opposite end faces of the piston to the pilot valve, thereby making it possible to lessen the degree of influence of differential pressure on the pilot valve.

5 Claims, 6 Drawing Sheets

CONSTANT FLOW RATE EXPANSION VALUE

CROSS-REFERENCE TO RELATED APPLICATIONS

This application claims priorities of Japanese Application No. 2005-055555 filed on Mar. 1, 2005, entitled "CONSTANT FLOW RATE EXPANSION VALVE".

BACKGROUND OF THE INVENTION (1) Field of the Invention

The present invention relates to a constant flow rate expansion valve, and more particularly to a constant flow rate expansion valve for use in a refrigeration cycle for an automotive air conditioner, which adiabatically expands high-temperature, high-pressure refrigerant to thereby change the high-temperature, high-pressure refrigerant into low-temperature, low-pressure refrigerant to deliver the refrigerant to an evaporator at a constant flow rate.

(2) Description of the Related Art

In general, a refrigeration cycle for an automotive air conditioner comprises a compressor, a condenser or a gas cooler, an expansion valve, an evaporator, and an accumulator. Out of these component elements, the compressor and the expansion valve control the flow rate of refrigerant. In a variable displacement compressor, to control the flow rate of refrigerant, an electronic control valve is sometimes used which performs differential pressure control such that the difference between discharge pressure and suction pressure of the compressor becomes constant irrespective of the flow rate of refrigerant. In this case, it is recommended that for an expansion valve for electronic control, a constant flow rate expansion valve that controls the flow rate of refrigerant such that it becomes constant irrespective of the differential pressure across the expansion valve is employed so as to avoid contention between the differential pressure control carried out by the electronic control valve of the variable displacement compressor, and the control by the expansion valve.

A known constant flow rate expansion valve is described e.g. in Japanese Unexamined Patent Publication (Kokai) No. 2001-153495 (FIG. 1). This expansion valve is constructed by combining a solenoid that is capable of changing a flow passage cross-sectional area of a refrigerant passage at a part where refrigerant is adiabatically expanded, and a constant differential pressure valve that keeps constant the differential pressure across the refrigerant passage of which the flow passage cross-sectional area is set by the solenoid. Therefore, the constant differential pressure valve controls the differential pressure across the refrigerant passage of which the flow passage cross-sectional area is determined by the solenoid such that the differential pressure is held constant, and therefore the flow rate of refrigerant flowing through the refrigerant passage is controlled to be constant. The flow rate can be freely set by the value of electric current supplied to the solenoid.

Further, the differential pressure valve includes a piston that senses the differential pressure across the refrigerant passage by opposite ends thereof, and operates in the valve-opening or valve-closing direction according to the differential pressure, and a constant flow rate expansion valve is also known which has improved degradation of characteristics due to small leakage of refrigerant via a sliding portion of the piston (see e.g. Japanese Unexamined Patent Publication (Kokai) No. 2004-53192 (FIG. 1)).

According to this constant flow rate expansion valve, a main valve, and a restriction device interlocked with a solenoid are arranged in series in the direction of flow of refrigerant, and in parallel therewith, a piston for actuating a main valve element, having a fixed orifice, a pressure chamber, and a pilot valve forming a variable orifice together with the solenoid are arranged in series. As a result, since the sliding portion of the piston is connected to the pressure chamber, refrigerant that leaks from the sliding portion leaks into the pressure chamber, and further the refrigerant having leaked is controlled by the pilot valve together with refrigerant discharged from the pressure chamber, whereby it is possible to substantially eliminate the influence of leakage of refrigerant from the sliding portion of the piston.

In the constant flow rate expansion valve constructed as described above, when the solenoid is controlling the pilot valve to a valve lift dependent on the value of electric current supplied thereto, the pressure chamber is under pressure corresponding to the size of the variable orifice formed by the pilot valve, and hence the piston controls the main valve to a valve lift dependent on the differential pressure between the pressure in the pressure chamber and pressure in an inlet port so that refrigerant flows through the main valve and the restriction device at a predetermined flow rate. Now, when the flow rate of refrigerant increases, the differential pressure across the restriction device interlocked with the solenoid increases, and therefore the differential pressure controls the pilot valve in a direction of decreasing the variable orifice. The pressure in the pressure chamber on the upstream side increases in proportion to decrease in the variable orifice, and the piston operates to reduce the flow rate of refrigerant by controlling the main valve in the valve-closing direction. Inversely, when the flow rate of refrigerant decreases, the main valve is controlled in the valve-opening direction for increasing the flow rate of refrigerant. As a result, the flow rate of refrigerant flowing through the constant flow rate expansion valve is controlled to a constant flow rate determined by the solenoid.

In the conventional constant flow rate expansion valve which is configured to control pressure in the pressure chamber by the pilot valve disposed on the outlet port side, the valve element of the pilot valve receives the differential pressure between outlet pressure and the pressure in the pressure chamber in the valve-opening direction. However, the pressure in the pressure chamber is close to inlet pressure, and hence the differential pressure applied to the valve element of the pilot valve is very large. This differential pressure acts as a disturbance for the pilot valve which operates by sensing the flow rate of refrigerant flowing through the restriction device, and hence it is desirable to eliminate the differential pressure. In this case, it is contemplated that a mechanism for canceling the differential pressure is added to the pilot valve. However, this makes the construction of the constant flow rate expansion valve very complicated, and therefore the pressure-receiving area of the variable orifice is made smaller to thereby lessen the degree of influence of the differential pressure on the pilot valve. However, there is a limit in decreasing the pressure-receiving area, and the degree of influence of the differential pressure in the valve-opening direction is large against a force which the pilot valve causes to act on the valve element thereof in the valve-closing direction, by sensing the flow rate of refrigerant, which makes the differential pressure unnegligible. This causes the problem that the pilot valve tends to act as if it were a constant differential pressure valve.

SUMMARY OF THE INVENTION

The present invention has been made in view of this problem, and an object thereof is to provide a constant flow rate expansion valve with a reduced degree of influence of differential pressure on a pilot valve.

To solve the above problem, the present invention provides a constant flow rate expansion valve including a main valve for controlling a flow rate of refrigerant, a piston for actuating the main valve in a valve-opening/closing direction by differential pressure between pressure on an upstream side of the main valve and pressure in a pressure chamber formed on a side opposite to the main valve, and a pilot valve controlled such that the pressure in the pressure chamber is set by a solenoid, and becomes constant by sensing a change in the flow rate of refrigerant, wherein a restriction passage for generating differential pressure in proportion to the flow rate of refrigerant so as to control the pilot valve by the differential pressure and the main valve are arranged in series between a refrigerant inlet port and a refrigerant outlet port in a direction of flow of refrigerant, while the pilot valve, the pressure chamber, and a fixed orifice arranged in series in the direction of flow of the refrigerant are disposed in parallel with the main valve.

The above and other object, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 3A and 3B are explanatory views showing states of pressure in a pilot valve, in which

DESCRIPTION OF THE PREFERRED EMBODIMENTS

Hereinafter, an embodiment of the present invention will be described in detail with reference to the drawings.

Figure 1:
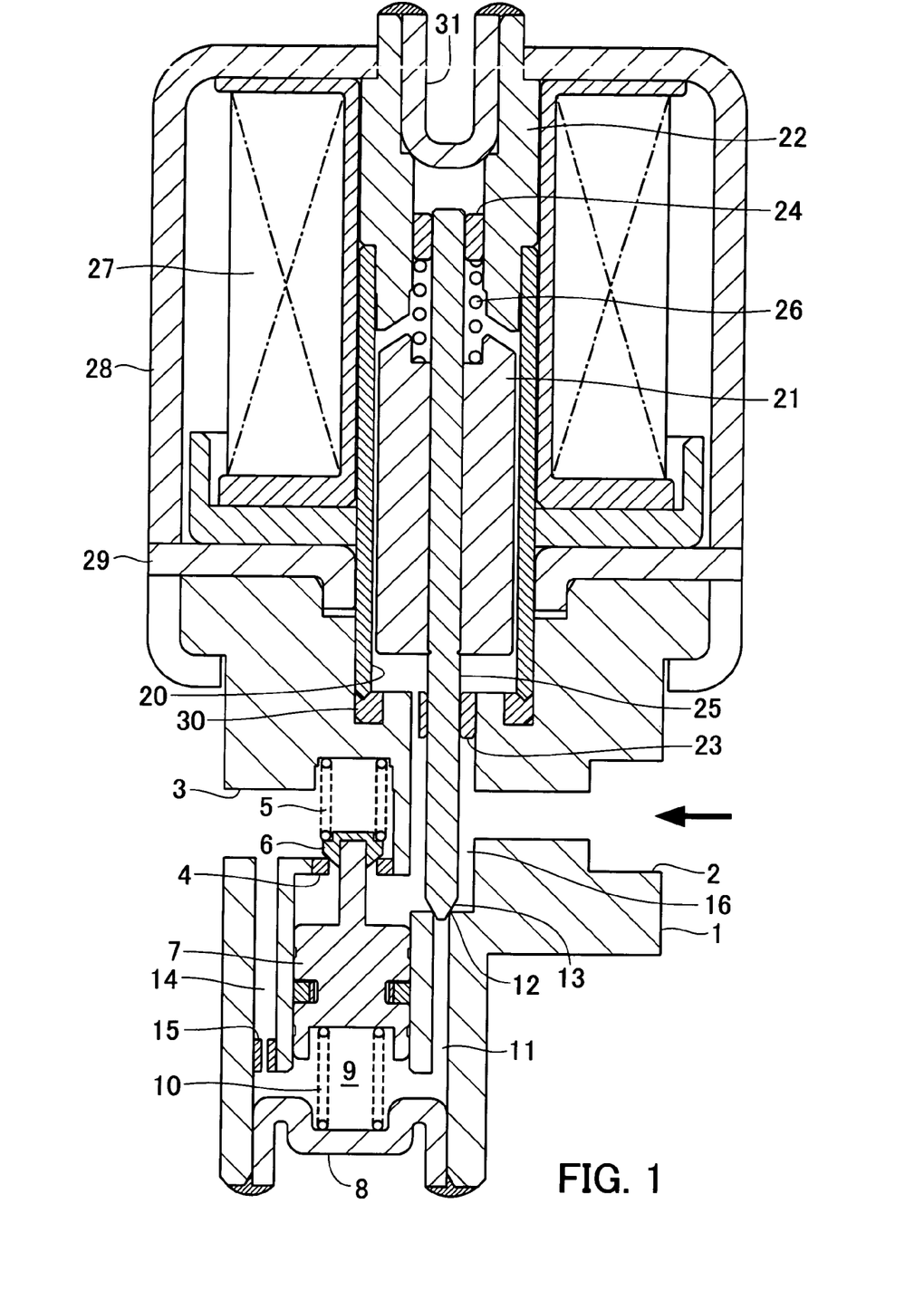
FIG. 1 is a longitudinal cross-sectional view showing the construction of a constant flow rate expansion valve according to a first embodiment of the present invention, in a closed state thereof.
Figure 2:
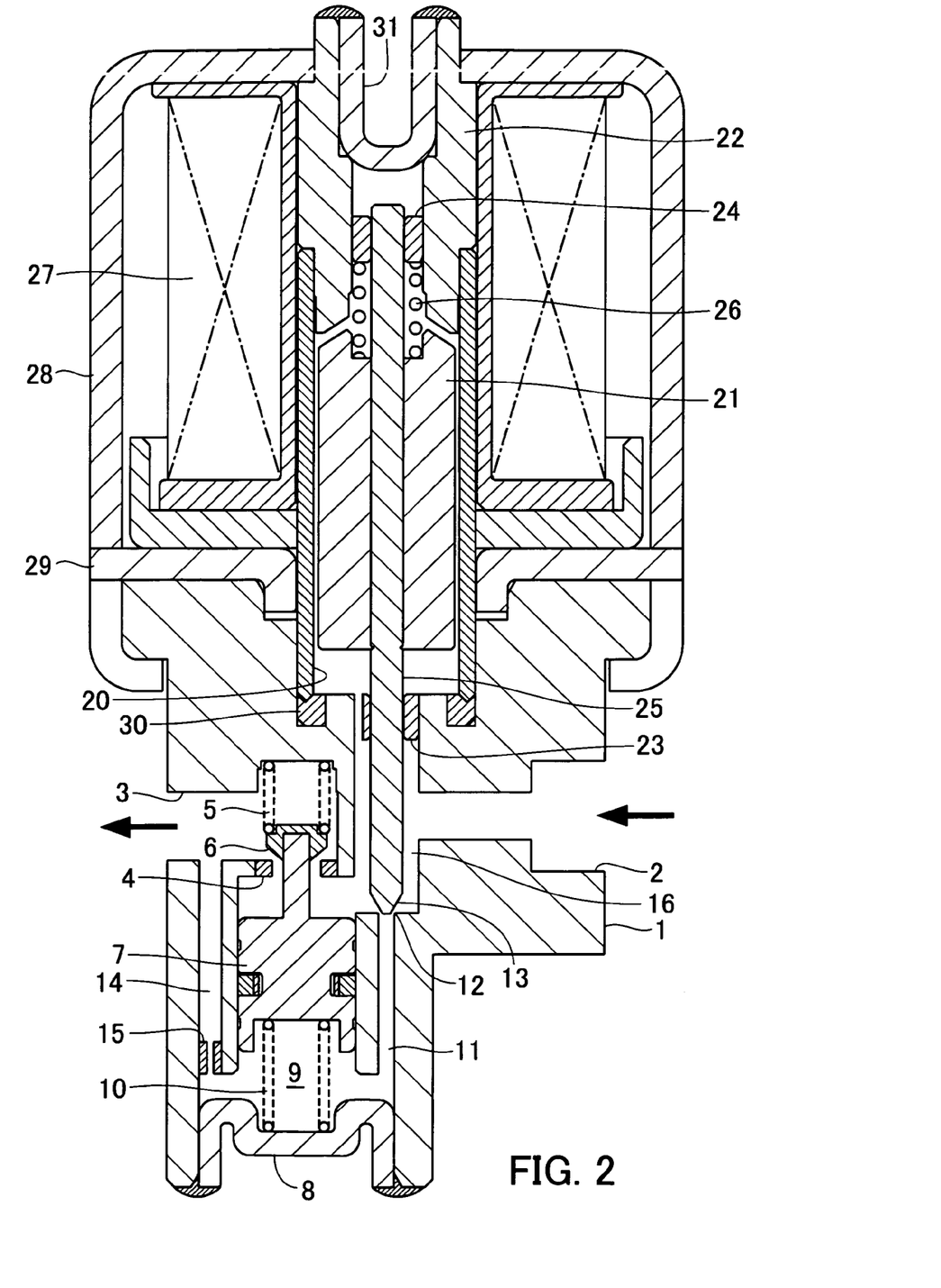
FIG. 2 is a longitudinal cross-sectional view showing the construction of the constant flow rate expansion valve according to the first embodiment, in an open state thereof.

FIG. 1 is a longitudinal cross-sectional view showing the construction of a constant flow rate expansion valve according to a first embodiment, in a closed state thereof. FIG. 2 is a longitudinal cross-sectional view showing the construction of the constant flow rate expansion valve according to the first embodiment, in an open state thereof.

The constant flow rate expansion valve according to the first embodiment has a body 1 formed with a refrigerant inlet port 2 into which high-pressure refrigerant is introduced, and a refrigerant outlet port 3 from which low-pressure refrigerant is discharged toward an evaporator, opening in respective side surfaces of the body 1. A main valve seat 4 is press-fitted into an intermediate portion of a refrigerant passage communicating between the refrigerant inlet port 2 and the refrigerant outlet port 3. A main valve element 6 urged in the valve-closing direction by a spring 5 is disposed in a manner opposed to the main valve seat 4 from the downstream side, and forms a main valve together with the main valve seat 4.

On the upstream side of the main valve, a piston 7 is movably disposed within a cylinder hole formed in the body 1 along the same axis as that of the main valve. The piston 7 is connected to the main valve element 6 by a shaft extending through a valve hole of the main valve. Formed below the piston 7, as viewed in FIG. 1, is a pressure chamber 9 which is formed by closing an opening of the body 1 with a press-fitted member 8. A spring 10 for urging the piston 7 in the valve-opening direction of the main valve is disposed between the piston 7 and the press-fitted member 8. The load of the spring 10 is adjusted by the press-fitted amount of the press-fitted member 8, and after adjustment of the load, a lower end of the press-fitted member 8, as viewed in the figure, is welded to the body 1, whereby the pressure chamber 9 is hermetically sealed from the outside.

The pressure chamber 9 is communicated with a chamber communicating with the upstream side of the main valve via a pilot passage 11 formed in the body 1, and an opening of the pilot passage 11 into the chamber forms a pilot valve seat 12. A pilot valve element 13 in the form of a needle is disposed in a manner opposed to the pilot valve seat 12 from the upstream side, and forms a pilot valve functioning as a variable orifice together with the pilot valve seat 12. The pressure chamber 9 is also communicated with the downstream side of the main valve, that is, a chamber communicating with the refrigerant outlet port 3, via a refrigerant passage 14 formed in the body 1. An orifice-forming member 15 functioning as a fixed orifice is press-fitted into the refrigerant passage 14. Of course, it is possible to dispense with the orifice-forming member 15 if a refrigerant passage 14 having the same inner diameter as that of a through hole of the orifice-forming member 15 can be formed in the body 1.

The pilot valve element 13 is disposed in a passage between an inlet port of the pilot valve and the refrigerant inlet port 2, whereby a restriction passage 16 is formed which restricts the flow rate of refrigerant flowing from the refrigerant inlet port 2. The restriction passage 16 restricts the flow rate of refrigerant to generate differential pressure between the refrigerant inlet port 2 and the inlet port of the pilot valve, which serves as a force for urging the pilot valve element 13 in the valve-closing direction. Therefore, the restriction passage 16 has the function of controlling the pilot valve by sensing the flow rate of refrigerant.

Disposed on the top of the body 1 is a solenoid that controls the pilot valve. The solenoid comprises a sleeve 20 having a lower end thereof fitted in a hole formed in an upper portion of the body 1, a plunger 21 axially movably disposed in the sleeve 20, a core 22 that is in a hollow form and is fitted in an upper end of the sleeve 20, a shaft 25 that is fixedly disposed in the plunger 21 in a manner axially extending therethrough, a lower portion of which is supported by a bearing 23 press-fitted into the body 1, and an upper end of which is supported by a bearing 24 press-fitted into a hole formed through the core 22 along the axis thereof, a spring 26 disposed between the plunger 21 and the bearing 24, for urging the pilot valve element 13 in the valve-closing direction via the shaft 25, a coil 27 disposed around the outer periphery of the sleeve 20, a yoke 28 formed in a manner surrounding the outside of the coil 27, and a plate 29 disposed between the yoke 28 and the sleeve 20, for making a magnetic circuit.

An annular packing 30 is disposed in the bottom of the hole formed in the top of the body 1. When the sleeve 20 is fitted in the hole, the annular packing 30 is press-fitted in the bottom by the foremost ends of the sleeve 20 formed to have an acute angle, thereby providing a seal from the outside. The upper open end of the core 22 is closed by a press-fitted member 31, and the upper ends of the core 22 and the press-fitted member 31 are hermetically sealed by welding.

The shaft 25 of the solenoid is formed integrally with the pilot valve element 13. Further, the pilot passage 11, a hole in which the bearing 23 is press-fitted, and the hole in which the sleeve 20 is fitted, all of which are formed in the body 1, are formed along the same axis. Thus, the pilot passage 11 and the holes are substantially on the same axis, and therefore the pilot valve element 13 formed integrally with the foremost end of the shaft 25 as an additional component can be guided to the pilot valve seat 12 which is substantially on the same axis as that of the pilot valve element 13.

The load of the spring 26 disposed between the plunger 21 and the bearing 24 is adjusted by adjusting the amount of press-fitting insertion of the bearing 24 into the core 22. Further, the solenoid is secured to the body 1 by swaging the lower end of the yoke 28 to a flange formed on the top of the body 1.

Next, a description will be given of the operation of the constant flow rate expansion valve constructed as described above. First, when refrigerant is not introduced into the refrigerant inlet port 2 in a state in which the coil 27 is in a deenergized state where control current is not supplied thereto, the main valve is in a fully open state, since the spring load of the spring 10 urging the piston 7 is set to be larger than that of the spring 5 urging the main valve element 6. Further, the pilot valve is in a fully closed state, since the pilot valve element 13 is urged in the valve-closing direction by the spring 26 contained in the solenoid, and seated on the pilot valve seat 12.

In the above state, when refrigerant is introduced into the refrigerant inlet port 2, the refrigerant is introduced into a chamber above the piston 7 via the restriction passage 16. The pressure-receiving area of the main valve element 6 is smaller than the pressure-receiving area of the piston 7, and the pressure chamber 9 is under low pressure since the pressure chamber 9 communicates with the refrigerant outlet port 3 via the orifice-forming member 15, so that the piston 7 is pressed downward by high refrigerant pressure overcoming the urging force of the spring 10, and the main valve is fully closed, as shown in FIG. 1. Thus, the constant flow rate expansion valve is in the fully closed state.

Now, when proper control current is supplied to the coil 27, the plunger 21 is attracted by the core 22, and therefore the pilot valve element 13 stands still at a location where the attractive force of the plunger 21 and the load of the spring 26 are balanced, whereby the pilot valve is set to a certain lift amount. This causes high-pressure refrigerant to be supplied to the pressure chamber 9 below the piston 7 via the pilot valve having the orifice set by the solenoid and the pilot passage 11, and refrigerant flows from the orifice-forming member 15 to the refrigerant outlet port 3 at a constant flow rate smaller than the flow rate of refrigerant introduced into the pressure chamber 9, whereby the pressure chamber 9 is pressurized to a certain value. As a result, the piston 7 is moved to a position where the differential pressure between the pressure in the chamber above the piston 7 and the pressure in the pressure chamber 9 below the piston 7 and the loads of the springs 5 and 10 are balanced, and therefore the main valve element 6 connected to the piston 7 is also moved away from the main valve seat 4 by the amount of the movement of the piston 7, whereby as shown in FIG. 2, the main valve is opened, allowing refrigerant to flow through the constant flow rate expansion valve at a predetermined flow rate dependent on the value of control current. At this time, an urging force in the valve-closing direction is caused to act on the pilot valve element 13 by differential pressure generated across the restriction passage 16 according to the flow rate of refrigerant flowing through the restriction passage 16.

In this state, when the flow rate of refrigerant changes, the differential pressure generated across the restriction passage 16 changes, and accordingly the lift amount of the pilot valve changes. As a result, the pressure in the pressure chamber 9 on the downstream side of the pilot valve changes to change the lift amount of the main valve. For example, when the flow rate of refrigerant increases, the pilot valve element 13 is urged in the valve-closing direction due to an increase in the differential pressure generated across the restriction passage 16. Consequently, the pressure in the pressure chamber 9 lowers to move the piston 7 downward, as viewed in FIG. 2, whereby the main valve is moved in the valve-closing direction to decrease the flow rate of refrigerant flowing through the main valve. Inversely, when the flow rate of refrigerant decreases, the differential pressure across the restriction passage 16 lowers, which increases the variable orifice of the pilot valve to increase the pressure in the pressure chamber 9, whereby the main valve is moved in the valve-opening direction, to increase the flow rate of refrigerant. Thus, refrigerant is discharged from the constant flow rate expansion valve at a constant flow rate maintained according to the value of the control current of the solenoid.

When the value of the control current supplied to the coil 27 is changed from the above state in which the flow rate of refrigerant discharged from the constant flow rate expansion is maintained constant, the variable orifice of the pilot valve changes to change the pressure in the pressure chamber 9 on the downstream side of the pilot valve, whereby the lift amount of the main valve changes. For example, when the value of the control current is increased, the variable orifice is made larger, so that the pressure in the pressure chamber 9 increases to decrease differential pressure applied to the opposite end faces of the piston 7, so that the piston 7 is moved upward, as viewed in FIG. 2, whereby the main valve is set to a lift position that allows refrigerant to flow at a larger flow rate. Inversely, when the value of the control current is reduced, the variable orifice is made smaller, so that the pressure in the pressure chamber 9 decreases to increase the differential pressure applied to the opposite end faces of the piston 7, so that the piston 7 is moved downward, as viewed in FIG. 2, whereby the main valve is set to a lift position that allows refrigerant to flow at a smaller flow rate.

Next the structural characteristics of the constant flow rate expansion valve according to the present invention will be described compared with the conventional constant flow rate expansion valve disclosed in the aforementioned Japanese Unexamined Patent Publication (Kokai) No. 2004-53192.

Figure 3A:
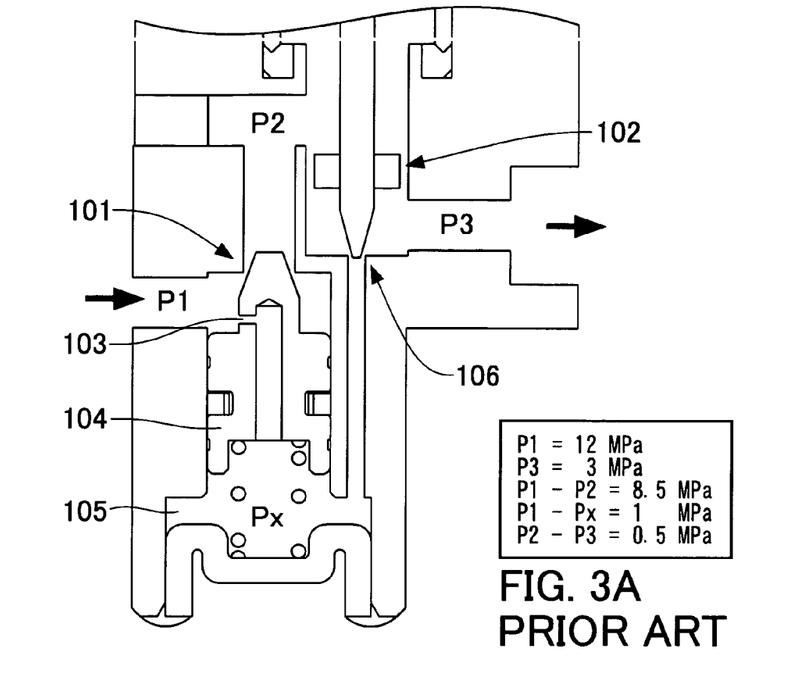
FIG. 3A is an enlarged fragmentary cross-sectional view of essential parts of a conventional constant flow rate expansion valve.
Figure 3B:
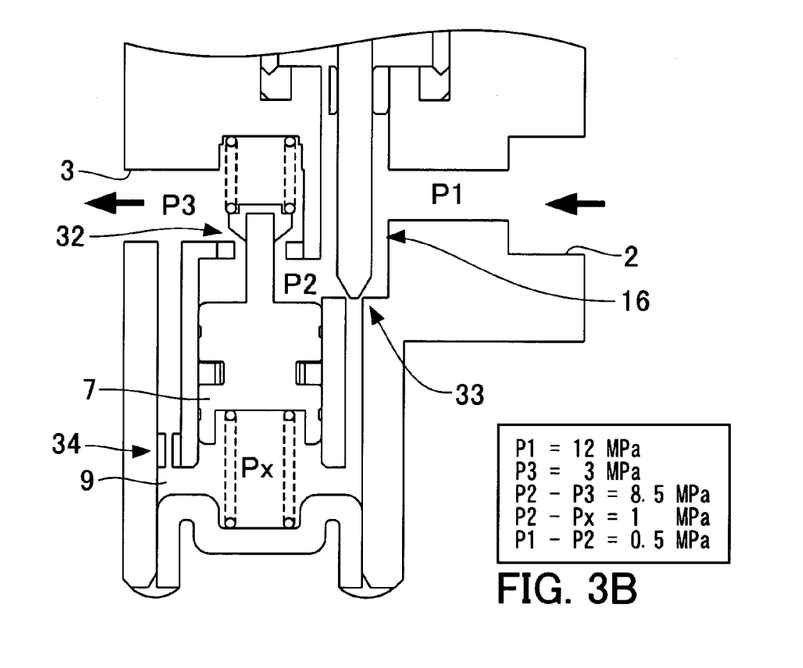
FIG. 3B is an enlarged fragmentary cross-sectional view of essential parts of a constant flow rate expansion valve according to the present invention.

FIGS. 3A and 3B are explanatory views showing states of pressure in the pilot valve, in which FIG. 3A is an enlarged fragmentary cross-sectional view of essential parts of the conventional constant flow rate expansion valve, and FIG. 3B is an enlarged fragmentary cross-sectional view of essential parts of the constant flow rate expansion valve according to the present invention.

As shown in FIG. 3A, the conventional constant flow rate expansion valve is configured such that a main valve 101 and a restriction device 102 interlocked with a solenoid are arranged in series in the direction of flow of refrigerant, and in parallel therewith, a piston 104 for actuating a main valve element, having a fixed orifice 103, a pressure chamber 105, and a pilot valve 106 forming a variable orifice by the solenoid are arranged in series in the direction of flow of refrigerant. In contrast, as shown in FIG. 3B, the constant flow rate expansion valve according to the present invention is configured such that the restriction passage 16 and the main valve 32 are arranged between the refrigerant inlet port 2 and the refrigerant outlet port 3 in series in the direction of flow of refrigerant, and in parallel with the main valve 32, the pilot valve 33, the pressure chamber 9, and a fixed orifice 34 are arranged in series in the direction of flow of refrigerant.

In FIGS. 3A and 3B, as to pressures of the essential parts, inlet pressure is represented by P1, intermediate pressure by P2, outlet pressure by P3, and pressure in the pressure chambers 105 and 9 by Px. Now, let it be assumed that the inlet pressure P1 and the outlet pressure P3 are 12 MPa and 3 MPa, respectively, and differential pressure across the main valves 101 and 32 is 8.5 MPa, differential pressure applied to the opposite ends of the pistons 104 and 7 is 1 MPa, and differential pressure across the restriction device 102 and the restriction passage 16 is 0.5 MPa, by way of example.

Here, when attention is paid to pressures applied to the pilot valves 106 and 33, it is understood that in the conventional constant flow rate expansion valve, the differential pressure (Px−P3) is 8 MPa since the pressure in the pressure chamber 105 is 11 MPa, whereas in the constant flow rate expansion valve according to the present invention, the differential pressure (P2−Px) is only 1 MPa since the pressure in the pressure chamber 9 is 10.5 MPa. This means that if the other conditions of the pressures are the same, it is possible to largely reduce the degree of influence of the differential pressure on the pilot valve 33. As described hereinabove, the differential pressure acts as a disturbance for the pilot valve that operates by sensing the flow rate of refrigerant by the restriction device 102 or the restriction passage 16, and therefore it is desirable that the differential pressure is minimized. The constant flow rate expansion valve according to the present invention makes it possible to sufficiently lower the differential pressure without providing a particular mechanism for canceling the differential pressure.

Figure 4:
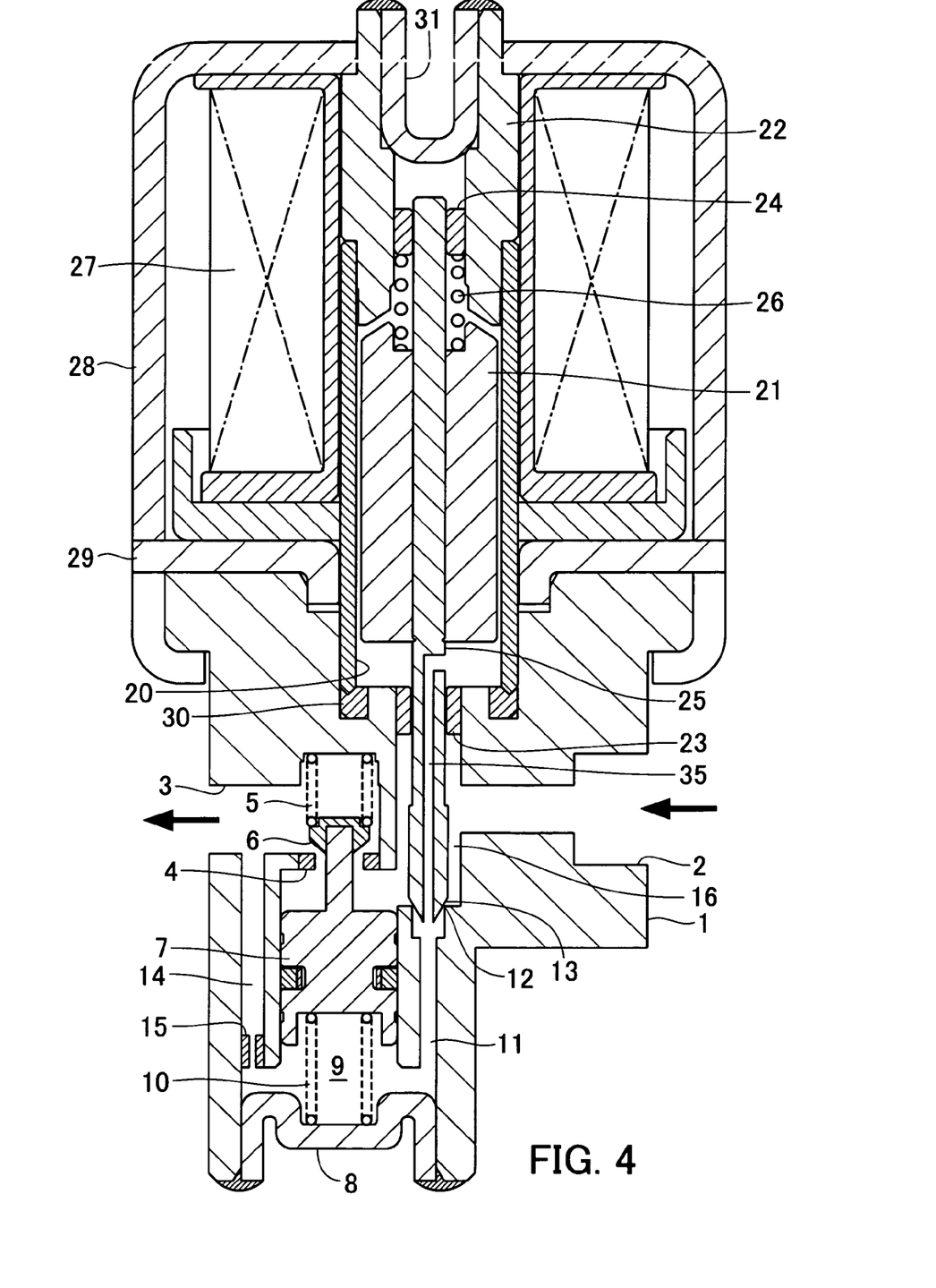
FIG. 4 is a longitudinal cross-sectional view showing the construction of a constant flow rate expansion valve according to a second embodiment of the present invention.

FIG. 4 is a longitudinal cross-sectional view showing the construction of a constant flow rate expansion valve according to a second embodiment of the present invention. In FIG. 4, component elements which have functions identical to or equivalent to those of the component elements appearing in FIGS. 1 and 2, are designated by identical reference numerals, and detailed description thereof is omitted.

The constant flow rate expansion valve according to the second embodiment is distinguished in respect of construction from the constant flow rate expansion valve according to the first embodiment in that it has additional means for canceling the differential pressure applied to the pilot valve. More specifically, in this constant flow rate expansion valve, a clearance of the bearing 23 axially movably supporting the shaft 25 of the solenoid is set to be sufficiently small, whereby the inside of the solenoid is sufficiently hermetically closed. Further, a pressure-equalizing hole 35 is disposed in the centers of the shaft 25 and the pilot valve element 13 such that the pilot passage 11 communicating with the pressure chamber 9 and the hermetically closed inside of the solenoid communicate with each other.

With this configuration, the pressure in the inside of the solenoid is substantially equal to that in the pressure chamber 9, so that the pressure from the pressure chamber 9 is applied to the pilot valve element 13 in the valve-opening direction, and the same pressure is applied to an end face of the shaft 25 formed integrally with the pilot valve 13 in the valve-closing direction, whereby the differential pressure is canceled, and the pilot valve is operated only by the differential pressure that is generated across the restriction passage 16 in proportion to the flow rate of refrigerant. The other features of the configuration and operation of the constant flow rate expansion valve according to the second embodiment are the same as those of the constant flow rate expansion valve according to the first embodiment.

Figure 5:
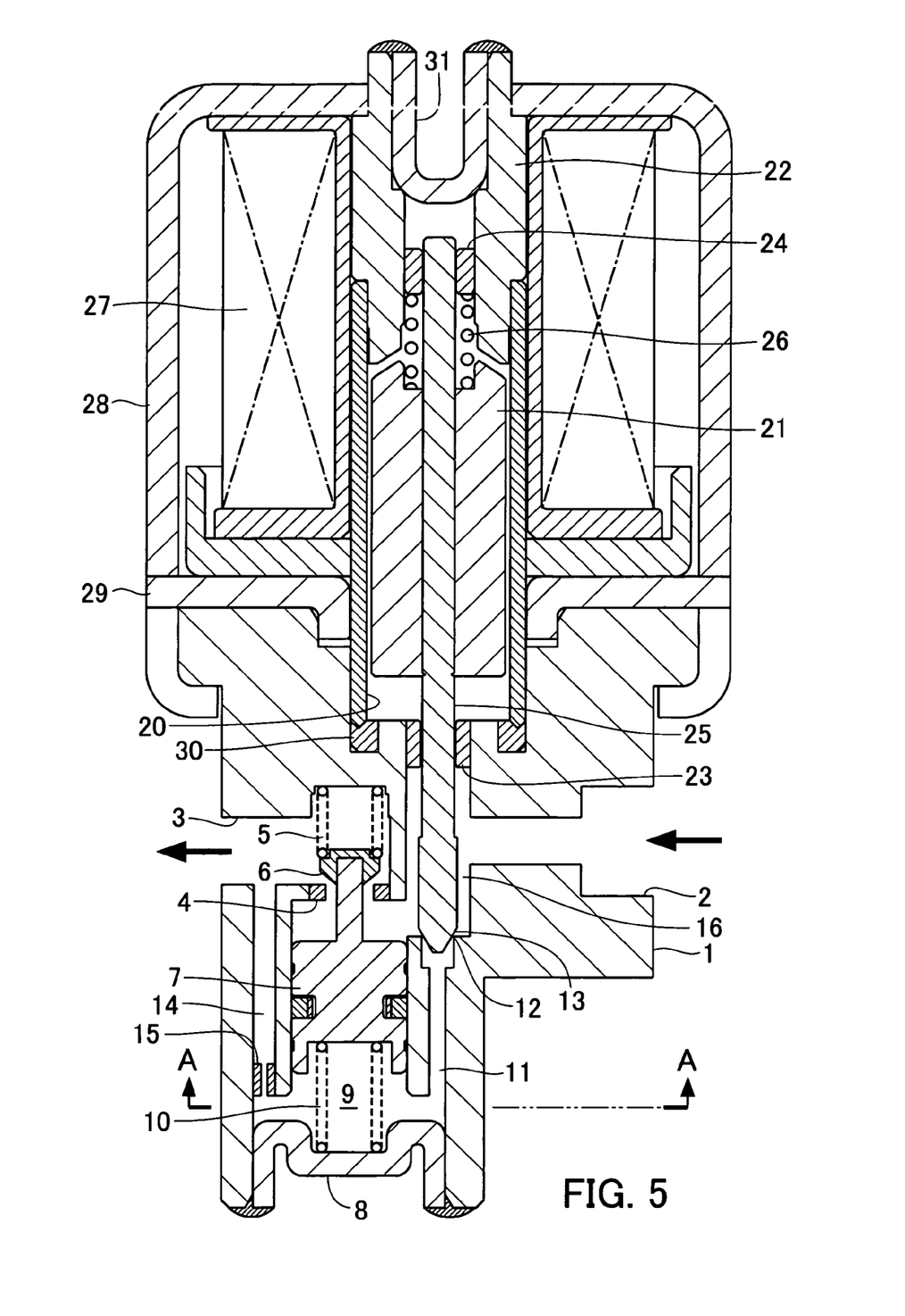
FIG. 5 is a longitudinal cross-sectional view showing the construction of a constant flow rate expansion valve according to a third embodiment of the present invention.
Figure 6:
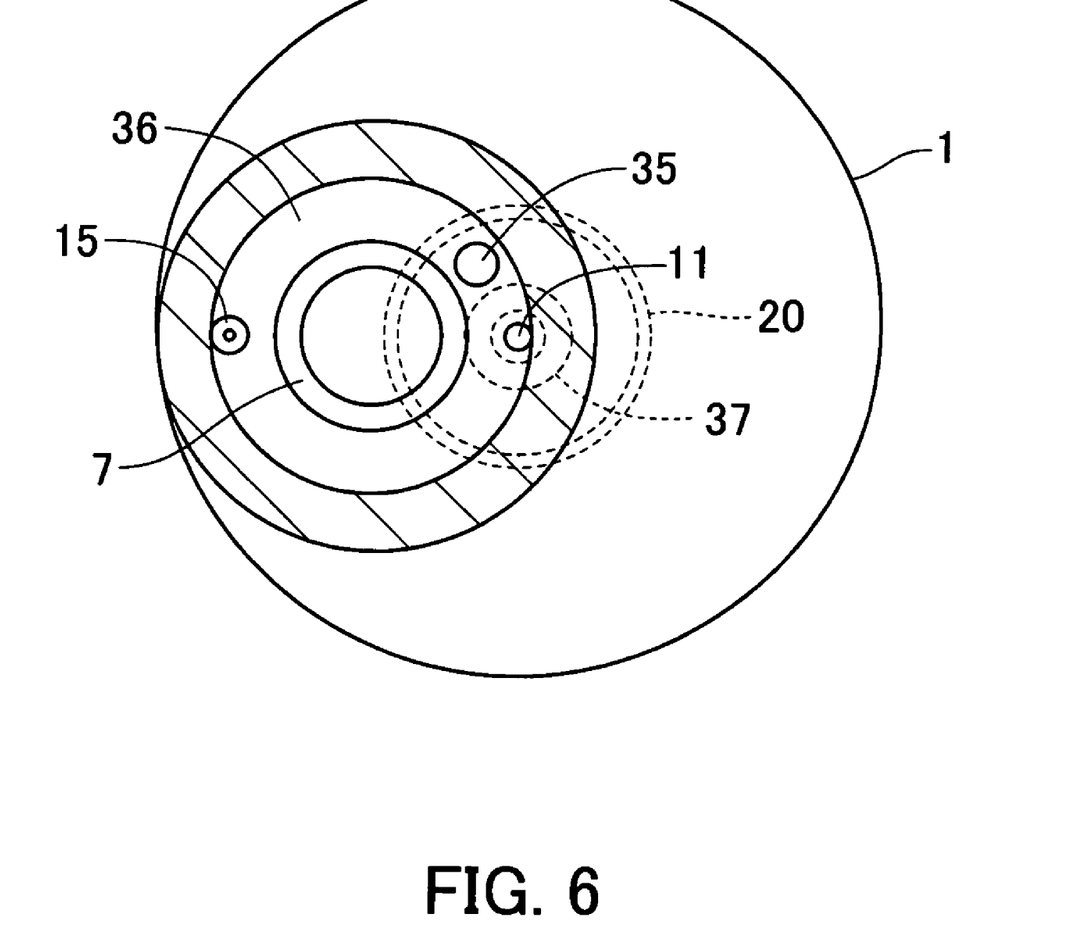
FIG. 6 is a cross-sectional view taken on line A-A of FIG. 5.

FIG. 5 is a longitudinal cross-sectional view showing the construction of a constant flow rate expansion valve according to a third embodiment of the present invention. FIG. 6 is a cross-sectional view taken on line A-A of FIG. 5. In FIGS. 5 and 6, component elements, which have functions identical to or equivalent to those of the component elements appearing in FIG. 4, are designated by identical reference numerals, and detailed description thereof is omitted. It should be noted that in FIG. 6, for clarity of illustration, a spring 10 urging the piston 7 is omitted.

The constant flow rate expansion valve according to the third embodiment is distinguished from the constant flow rate expansion valve according to the second embodiment in that the location of the pressure-equalizing hole 35 is changed. More specifically, although this constant flow rate expansion valve is configured similarly in that the shaft 25 and the bearing 23 are tightly fitted to each other, whereby the inside of the solenoid is sufficiently hermetically closed, the pressure-equalizing hole 35 is formed in the body 1. As shown in FIG. 6, a cylinder wall 36 within which the piston 7 is disposed partially overlaps the inside of a hole formed in the top of the body 1 having the sleeve 20 fitted therein, as viewed in the direction of axis of the solenoid, and therefore the pressure-equalizing hole 35 is formed in a manner extending through the cylinder wall 36 in the overlapping area at a location avoiding a bearing-mounting hole 37 in which the bearing 23 is press-fitted.

As a result, pressure within the solenoid is made approximately equal to the pressure in the pressure chamber 9 by the pressure-equalizing hole 35, so that the differential pressure applied to the pilot valve element 13 is canceled, whereby the pilot valve can sense only the flow rate of refrigerant flowing through the restriction passage 16 for variably controlling the variable orifice. The other features of configuration and operation of the constant flow rate expansion valve according to the third embodiment are the same as those of the constant flow rate expansion valve according to the first and second embodiments.

The constant flow rate expansion valve according to the present invention is capable of decreasing differential pressure applied to the pilot valve to the same level as that of small differential pressure applied to opposite end faces of the piston. This makes it substantially possible to dispense with a mechanism for canceling the differential pressure, thereby making it possible to enhance the accuracy of control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A constant flow rate expansion valve including a main valve for controlling a flow rate of refrigerant, a piston for actuating the main valve in a valve-opening/closing direction by differential pressure between pressure on an upstream side of the main valve and pressure in a pressure chamber formed on a side opposite to the main valve, and a pilot valve controlled such that the pressure in the pressure chamber is set by a solenoid, and becomes constant by sensing a change in the flow rate of refrigerant, wherein a restriction passage for generating differential pressure in proportion to the flow rate of refrigerant so as to control the pilot valve by the differential pressure and the main valve are arranged in series between a refrigerant inlet port and a refrigerant outlet port in a direction of flow of refrigerant, while the pilot valve, the pressure chamber, and a fixed orifice arranged in series in the direction of flow of the refrigerant are disposed in parallel with the main valve.

2. The constant flow rate expansion valve according to claim 1, wherein the main valve has a main valve element disposed on a refrigerant output port side of a main valve seat, and the piston is slidably disposed between an inlet of the main valve and the pressure chamber in a direction of axis of the main valve, the piston being connected to a shaft that is integrally connected to the main valve element and extends through a valve hole of the main valve, and being urged in a valve-opening direction of the main valve.

3. The constant flow rate expansion valve according to claim 1, including differential pressure-canceling means for canceling differential pressure between pressure in the refrigerant inlet port which is applied to the pilot valve, and the pressure in the pressure chamber.

4. The constant flow rate expansion valve according to claim 3, wherein the differential pressure-canceling means is a pressure-equalizing hole formed in a valve element of the pilot valve, the valve element being formed integrally with a shaft of the solenoid, the pressure-equalizing hole having one end opening in a pilot passage communicating with the pressure chamber, and the other end opening in a hermetically closed inside of the solenoid.

5. The constant flow rate expansion valve according to claim 3, wherein the differential pressure-canceling means is a pressure-equalizing hole communicating between a hermetically closed inside of the solenoid and the pressure chamber.

* * * * *